July 25, 1961  F. M. DIRKS  2,993,274
MARKING DEVICE FOR PIPE CUTTERS
Filed Aug. 18, 1960
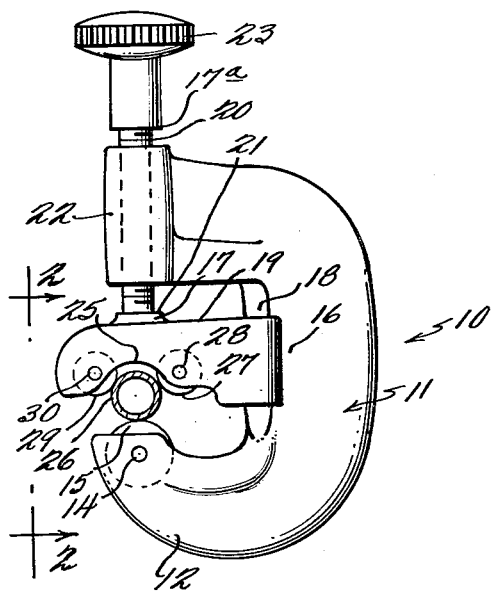
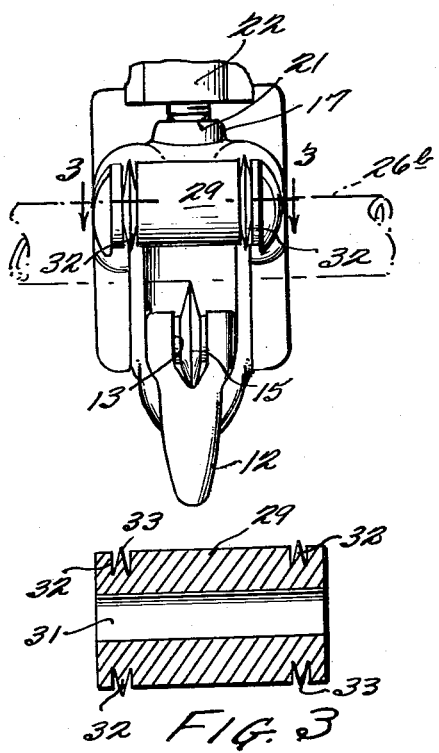
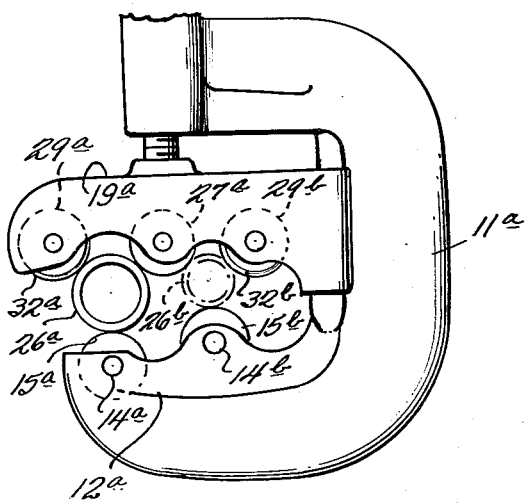
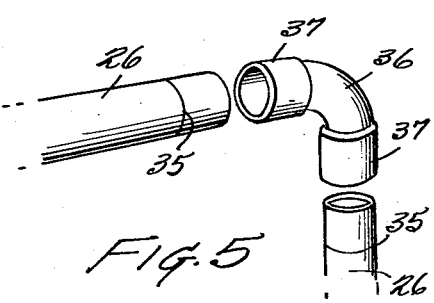
INVENTOR.
FRANCIS M. DIRKS
BY
Kimmel & Crowell
ATTORNEYS

United States Patent Office 2,993,274
Patented July 25, 1961

2,993,274
MARKING DEVICE FOR PIPE CUTTERS
Francis M. Dirks, 604 S. Cloudas, Sioux Falls, S. Dak.
Filed Aug. 18, 1960, Ser. No. 50,472
2 Claims. (Cl. 30—123)

This invention relates to a marking device for pipe cutters, and has as its primary object the provision of a roller associated with a pipe cutter for marking pipes during severance by the pipe cutter to provide an indication of the depth to which the pipe should be inserted in a fitting to insure a proper soldered joint.

As conducive to a clearer understanding of this invention, it may here be pointed out that in forming pipe joints particularly with copper pipes or tubing it has hereinbefore been customary to insert the end of a pipe into a female coupling, to a sufficient extent to permit soldering of the same to insure a tight joint. In the absence of any indication on the exterior of the pipe as to the proper depth of insertion it has sometimes happened that a pipe has been inserted incompletely, or to an insufficient distance, so that a relatively weak or leaky joint has resulted. By virtue of the instant arrangement a marking is indicated on the exterior surface of the pipe at a selected distance from the end during the cutting or severance of the pipe so that the proper insertion of the pipe to the requisite depth may be readily determined, thus insuring effective and fluid-tight joints at all times.

An additonal object of the invention is the provision of such a marking device which is automatic in operation, relatively simple and inexpensive to manufacture and simple and effective to utilize.

Still other objects reside in the combination of elements, arrangements of parts, and features of construction, all as will be more fully pointed out hereinafter and disclosed in the accompanying drawing wherein there are shown preferred embodiments of this inventive concept.

In the drawing:

FIGURE 1 is a side elevational view of one form of device embodying features of the instant invention;

FIGURE 2 is an enlarged sectional view taken substantially along the line 2—2 of FIG. 1 as viewed in the direction indicated by the arrows;

FIGURE 3 is an enlarged sectional view taken substantially along the line 3—3 of FIG. 2 as viewed in the direction indicated by the arrows;

FIGURE 4 is a fragmentary side elevational view of a modified form of construction; and FIGURE 5 is an exploded perspective view showing pipes marked by the device of the instant invention in association with a pipe coupling.

Similar reference characters refer to similar parts throughout the several views of the drawing.

Having reference now to the drawing in detail, the device of the instant invention is generally indicated at 10 and comprises a U-shaped bracket 11, one leg of which 12 extends upwardly and is bifurcated as at 13. An axle 14 supports a conventional rotary cutter blade 15 between the bifurcations, the portion 12 forming the lower or first jaw of the pipe cutter. The inner side of the bight portion 16 of bracket 11 is provided with a transverse flanged guide 18, upon which is slidably mounted a movable jaw 19, the jaw having a flanged rear portion 20 extending about opposite sides of the flanged guide 18 which thus serves as a track therefor. A screw 20 is swivelably mounted as at 21 in the upper surface of jaw 19, and extends through a suitable conventional threaded bore in the other leg 22 of the member 11. An operating knob 23 serves to rotate the screw 20. Upper jaw 19 is cut out as at 25 to allow room for pipe 26. A shoulder 17 on upper jaw 19 provides an opening stop against leg 22 of body 11 and a shoulder 17a on knob 23 acts as a closing stop, so as to limit operation of screw 20 to allow cutting of only the intended size of pipe with corresponding markings for solder cup depths. Rotation of the knob 23 forces the pipe tightly against the cutter 15, and rotation of the pipe cutter around pipe severs the same. An inner roller 27 is mounted on one side of the cut out portion 25 on an axle 28 and serves as a guide, while an outer roller 29 is mounted on an axle 30. The jaw 19 is bifurcated to accommodate the rollers 27 and 29 and extends out over roller 29 to serve as a shield or cover. The outer roller 29 comprises the essential element of the invention, and includes, as shown in FIG. 3, a bore 31 through which the axle 30 extends. The roller 29 has integrally formed therewith adjacent its opposite ends a pair of marking blades 32 which extend peripherally entirely around the circumference of the roller 29, and serve, as the pipe 26 is rotated during cutting, to form marks 35, as best shown in FIG. 5 at a predetermined distance from the severed end of the pipe, the cutting knife 15 being centered relative to the marking knives 32. It is noted, as best shown in FIG. 5, that the tip 33 of each blade 32 extends outwardly a slight distance beyond the periphery of the roller, in order to provide a marking of a suitable depth, but of an insufficient depth to weaken the pipe structure. As shown in FIG. 5, the mark 35 is positioned at a suitable distance from each end of each severed pipe section, and when employed in connection with a female fitting 36, having end cups 37, the marks 35 will indicate that the pipe ends have been inserted into the fitting fully, so that the joints may be soldered, and thus ensure a firm and fluid-tight joint.

FIGURE 4 discloses a slightly modified form of construction wherein the bracket 11a is substantially identical with the bracket 11 except that the lower jaw 12a includes two cutting knives 15a and 15b which are mounted on axles 14a and 14b at spaced intervals, and are adapted to engage pipes 26a and 26b of different diameters. A central roller 27a corresponds to the smooth roller 27 and on opposite sides thereof has positioned rollers 29a and 29b, each of which is provided with marking knife blades 32a and 32b substantially identical to the marking blades 32 previously discussed, the arrangement being such that two different sizes of pipe, 26a and 26b, may be cut and marked with the same tool. A screw 20a is operated in the same manner as that of the previously described modification, and serves the same purpose.

From the foregoing it will now be seen that there is herein provided an improved marking device for pipe cutters which accomplishes all the objects of this invention, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

I claim:

1. In a pipe cutter, in combination, a first bifurcated jaw, a second jaw movable toward and away from said first jaw, a rotary pipe cutting roller blade positioned between the bifurcations in said first jaw, a guide roller and a cylindrical marking roller disposed in said second jaw, the relative positioning of said rollers defining a pipe carrying channel, said cylindrical marking roller having marking blades equidistantly laterally spaced from said cutting roller and adjacent each end of said cylindrical marking roller, said marking blades being formed integrally with said cylindrical marking roller.

2. The structure as defined in claim 1, wherein an additional cutting roller is provided on said first jaw, and an additional cylindrical marking roller is provided in said second jaw, the relative positioning of said additional cylindrical marking roller and said additional cutting roller cooperating with the position of said guide roller to define a pipe carrying channel to accommodate cutting various sizes of pipe.

References Cited in the file of this patent

UNITED STATES PATENTS

| | | |
|---|---|---|
| 2,147,032 | Haury | Feb. 14, 1939 |
| 2,456,882 | Mackey | Dec. 21, 1948 |
| 2,563,483 | O'Hagan | Aug. 7, 1951 |
| 2,875,518 | Dyczynski | Mar. 3, 1959 |